United States Patent
Merrill et al.

(10) Patent No.: US 11,541,452 B2
(45) Date of Patent: Jan. 3, 2023

(54) MANUFACTURING METHOD AND TOOLING FOR CERAMIC CORES

(71) Applicants: Siemens Energy Global GmbH & Co. KG, Munich (DE); Mikro Systems, Inc., Charlottesville, VA (US)

(72) Inventors: Gary B. Merrill, Orlando, FL (US); Roy Eakins, Madison, VA (US)

(73) Assignees: Siemens Energy Global GmbH & Co. KG, Munich (DE); Mikro Systems, Inc., Charlottesville, VA (US)

( * ) Notice: Subject to any disclaimer, the term of this patent is extended or adjusted under 35 U.S.C. 154(b) by 0 days.

(21) Appl. No.: 17/483,429

(22) Filed: Sep. 23, 2021

(65) Prior Publication Data

US 2022/0008986 A1    Jan. 13, 2022

Related U.S. Application Data

(63) Continuation of application No. 16/070,594, filed as application No. PCT/US2016/023017 on Mar. 18, 2016, now abandoned.

(51) Int. Cl.
*B22C 9/10*    (2006.01)

(52) U.S. Cl.
CPC ................................ *B22C 9/10* (2013.01)

(58) Field of Classification Search
CPC ............... B22C 9/00; B22C 9/10; B22C 9/22
USPC ........................................................ 164/15
See application file for complete search history.

(56) References Cited

U.S. PATENT DOCUMENTS

2007/0063378 A1* 3/2007 O'Donoghue .......... B29C 33/40
                                                         425/406

* cited by examiner

*Primary Examiner* — Kevin P Kerns

(57) ABSTRACT

A method of manufacturing a tooling assembly and the tooling assembly (10) for ceramic cores. The tooling assembly includes a backing plate (12) comprising a top surface (20), side surfaces (18), and a bottom surface (16) and a plurality of lithographically derived inserts (14) each having a bottom surface (24), side surfaces (26), and a positive top surface (28) and pieced together on the top surface (20) of the backing plate (12). The method includes providing the backing plate (12) and plurality of lithographically derived inserts (14). A non-conformal positive surface is generated from the plurality of lithographically derived inserts (14). A negative flexible mold is created from the non-conformal positive surface. The negative flexible mold is then prepared for casting for an advanced ceramic core.

19 Claims, 1 Drawing Sheet

MANUFACTURING METHOD AND TOOLING FOR CERAMIC CORES

CROSS-REFERENCE TO RELATED APPLICATIONS

This application is a Continuation of U.S. patent application Ser. No. 16/070,594, filed Jul. 17, 2018, now abandoned, which is a national stage entry of International Patent Application No. PCT/US2016/023017, filed Mar. 18, 2016, the entire contents of which are hereby incorporated by reference.

BACKGROUND

1. Field

The present invention relates to manufacturing advanced ceramic cores and the master tooling for the manufacturing of ceramic cores.

2. Description of the Related Art

In gas turbine engines, compressed air discharged from a compressor section and fuel introduced from a source of fuel are mixed together and burned in a combustion section, creating combustion products defining a high temperature working gas. The working gas is directed through a hot gas path in a turbine section of the engine, where the working gas expands to provide rotation of a turbine rotor. The turbine rotor may be linked to an electric generator, wherein the rotation of the turbine rotor can be used to produce electricity in the generator.

In view of high pressure ratios and high engine firing temperatures implemented in modern engines, certain components, such as airfoils, e.g., stationary vanes and rotating blades within the turbine section, must be cooled with cooling fluid, such as air discharged from a compressor in the compressor section, to prevent overheating of the components.

Effective cooling of turbine airfoils requires delivering the relatively cool air to critical regions such as along the trailing edge of a turbine blade or a stationary vane. The associated cooling apertures may, for example, extend between an upstream, relatively high pressure cavity within the airfoil and one of the exterior surfaces of the turbine blade. Blade cavities typically extend in a radial direction with respect to the rotor and stator of the machine.

Airfoils commonly include internal cooling channels which remove heat from the pressure sidewall and the suction sidewall in order to minimize thermal stresses. Achieving a high cooling efficiency based on the rate of heat transfer is a significant design consideration in order to minimize the volume of coolant air diverted from the compressor for cooling. However, the relatively narrow trailing edge portion of a gas turbine airfoil may include, for example, up to about one third of the total airfoil external surface area. The trailing edge is made relatively thin for aerodynamic efficiency. Consequently, with the trailing edge receiving heat input on two opposing wall surfaces which are relatively close to each other, a relatively high coolant flow rate is entailed to provide the requisite rate of heat transfer for maintaining mechanical integrity.

Current methods of manufacturing ceramic cores for investment casting in order to produce these blades and vanes involve providing master tooling. Currently, the system to produce master tooling includes multi axis machining of an aluminum block to define the positive surface geometry of one side of a tooling block. In areas where non-conformal features are required, typically an insert is applied to the tooling surface to define advanced tool surface geometry. Due to the non-conformal features, these features are un-machinable. This insert has been manufactured using either bonded photo chemically etched copper foils bonded to make a three dimensional surface or electrical discharge machining (EDM) machined insert.

From the master tool surfaces, or overall tool surfaces, flexible mold liners are generated which becomes the casting vessel for making advanced ceramic cores for investment casting. A metal alloy component may be cast using a hollow ceramic core. The ceramic core defines the shape of the open volume when the component is cast within an outer casting shell.

As trailing edges become more advanced and fine feature based the issue of cost is exacerbated further due to increasing number of smaller features. When changes need to be made a whole new core and master tooling needs to be manufactured at high costs. Variants are not possible with this form of manufacturing. Rapid changes are not possible with this form of manufacturing as well.

SUMMARY

In an aspect of the present invention, a tooling assembly for ceramic cores, comprises: a backing plate comprising a top surface, side surfaces, and a bottom surface; a plurality of lithographically derived inserts each comprising a bottom surface, side surfaces, and a positive top surface, wherein the plurality of lithographically derived inserts are pieced together on the top surface of the backing plate; a second backing plate comprising a top surface, side surfaces, and a bottom surface; and a second plurality of lithographically derived inserts each comprising a bottom surface, side surfaces, and a positive top surface, wherein the plurality of lithographically derived inserts are pieced together on the top surface of the second backing plate.

In another aspect of the present invention, a method of manufacturing of a tooling assembly for ceramic cores, comprises: providing a plurality of lithographically derived inserts and a second plurality of lithographically derived inserts each comprising a bottom surface, side surfaces, and a positive top surface; providing a backing plate and a second backing plate each comprising a top surface, side surfaces, and a bottom surface, the backing plate and the second backing plate provided as a locator surface; generating a non-conformal positive surface from the plurality of lithographically derived inserts pieced together and placed on the backing plate; generating a non-conformal positive surface from the second plurality of lithographically derived inserts pieced together and placed on the second backing plate; creating a first negative flexible mold from the non-conformal positive surface of the plurality of lithographically derived inserts; creating a second negative flexible transfer mold from the non-conformal positive surface of the second plurality of lithographically derived inserts; and preparing the negative flexible mold for casting an advanced ceramic core.

These and other features, aspects and advantages of the present invention will become better understood with reference to the following drawings, description and claims.

BRIEF DESCRIPTION OF THE DRAWINGS

The invention is shown in more detail by help of figures. The figures show preferred configurations and do not limit the scope of the invention.

DETAILED DESCRIPTION

Figure 1:
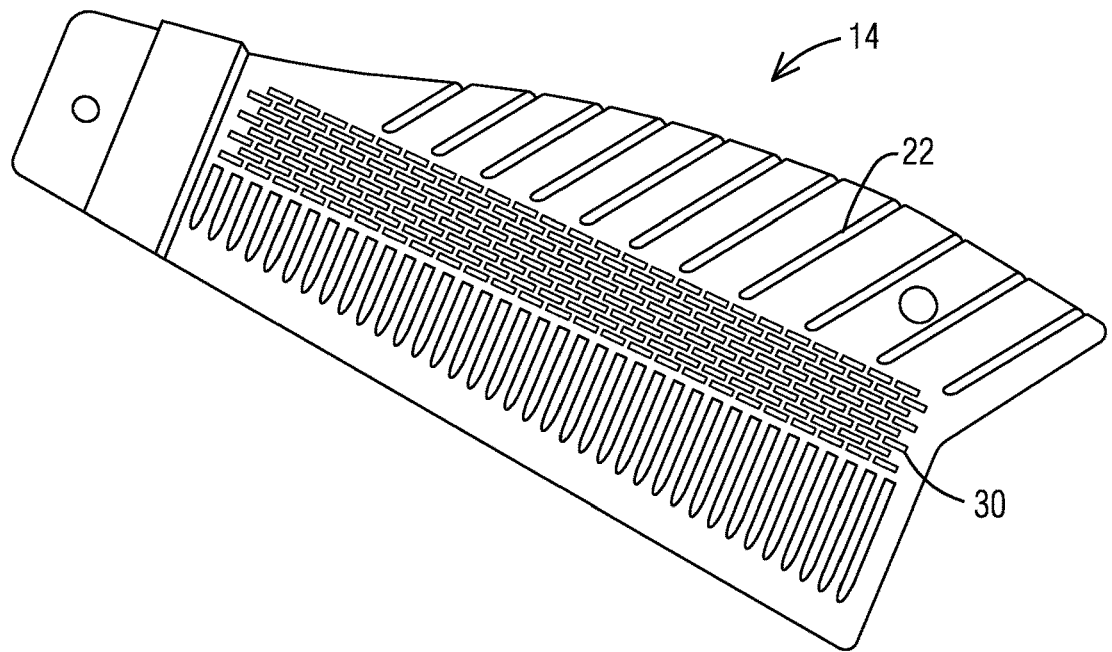
FIG. 1 is a perspective view of lithographically derived inserts of the exemplary embodiments of the present invention.

In the following detailed description of the preferred embodiment, reference is made to the accompanying drawings that form a part hereof, and in which is shown by way of illustration, and not by way of limitation, a specific embodiment in which the invention may be practiced. It is to be understood that other embodiments may be utilized and that changes may be made without departing from the spirit and scope of the present invention.

Broadly, a method of manufacturing a tooling assembly and the tooling assembly for ceramic cores. The tooling assembly includes a backing plate comprising a top surface and a plurality of lithographically derived inserts pieced together on the top surface of the backing plate. The method includes providing the backing plate and plurality of lithographically derived inserts. A non-conformal positive surface is generated from the plurality of lithographically derived inserts. A negative flexible mold is created from the non-conformal positive surface. The negative flexible mold is then prepared for casting for an advanced ceramic core.

Within the power industry, gas turbine engines are required to provide movement to produce electricity in a generator. In gas turbine engines, compressed air discharged from a compressor section and fuel introduced from a source of fuel are mixed together and burned in a combustion section, creating combustion products defining a high temperature working gas. The working gas is directed through a hot gas path in a turbine section of the engine, where the working gas expands to provide rotation of a turbine rotor. The turbine rotor may be linked to an electric generator, wherein the rotation of the turbine rotor can be used to produce electricity in the generator.

Modern engines and certain components such as airfoils, e.g. stationary vanes and rotating blades within the turbine section, implement high pressure ratios and high engine firing temperatures. As advancements are made, components are seeing higher and higher temperatures and require more and more expensive materials to produce these components.

As trailing edges on turbine blades become more advanced and fine feature based, the manufacturing of these airfoils and the costs involved become more important. The ability to change manufacturing methods allows for a reduced cost and time savings. Components are typically made from ceramic cores. For the purposes of this application, any reference to a ceramic material may also be any other material that functions in a similar fashion. Further, the reference to turbines and the power industry may also be for other processes and products that may require a core made from a casting process. Producing a blade can require first a production of a mold. The mold is produced from a master tooling surface.

A manufacturing process that allows for rapid low cost master tooling and for multiple variants in the tooling assembly is desirable. Embodiments of the present invention provide a method of manufacturing that may allow for the reduction of cost in manufacturing a master tooling assembly as well as the master tooling assembly itself. The turbine blade and airfoil are used below as an example of the method and tooling assembly; however, the method and tooling assembly may be used for any component requiring detailed features along a core for casting purposes. The turbine blade can be within the power generation industry.

The method and tooling assembly mentioned below may be in conjunction with a process that starts with a 3D computer model of a part to be created. From the model a solid surface is created from which a flexible mold can be created that is used in conjunction with a second mating flexible mold to form a mold cavity. The flexible mold is created from a machined master tool representing roughly fifty percent of the surface geometry of the core to be created. From such a tool, a flexible transfer mold can be created. In order to form a mold cavity, a second half of the master tool that creates a second flexible transfer mold, can be combined with the first flexible transfer mold to form the mold cavity. From such a mold cavity a curable slurry can be applied to create a three dimensional component form. An example of such a form can be a ceramic core used for investment casting.

In certain embodiments, such as a ceramic core used for investment casting, materials of construction can be specifically selected to work in cooperation with the casting and firing processes to provide a core that overcomes known problems with prior art cores. The materials and processes of embodiments of the present invention may result in a ceramic body which is suitable for use in a conventional metal alloy casting process.

Figure 2:
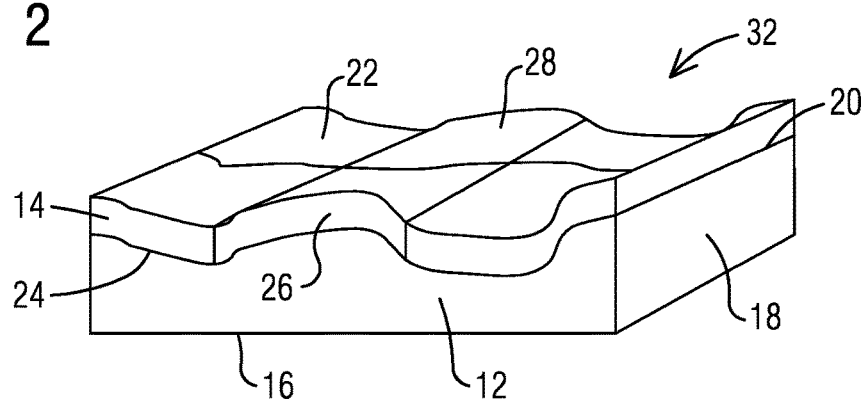
FIG. 2 is a perspective view of a schematic of a portion of a master tooling assembly with lithographically derived inserts in an exemplary embodiment of the present invention.
Figure 3:
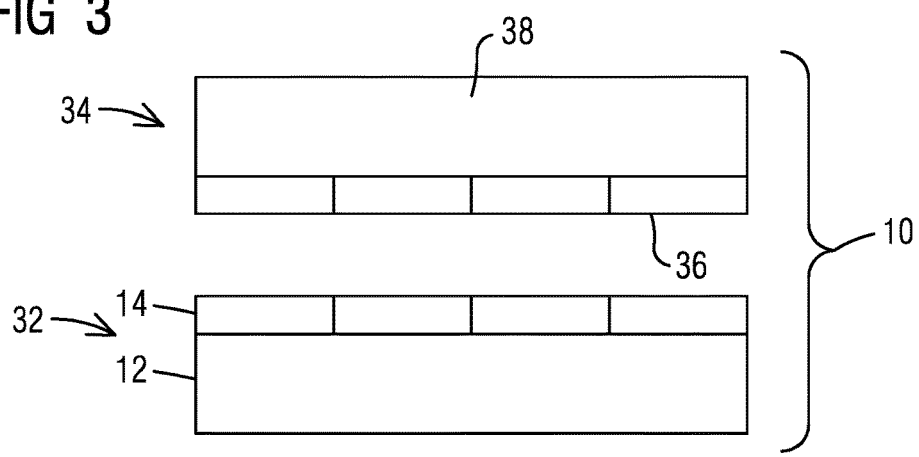
FIG. 3 is a side view of a schematic of a master tooling assembly in an exemplary embodiment of the present invention.

As is illustrated in FIGS. 1 through 3, a master tooling assembly 10 may be produced with a backing plate 12 and a plurality of lithographically derived inserts 14. Precision machined surfaces produced from computer numerical control (CNC) machines are replaced with the plurality of lithographically derived inserts 14 and backing plate 12. A single step machined surface, the backing plate 12, may serve as a locator surface for the plurality of lithographically derived inserts 14 pieced together to define a master tooling surface 22. Such features may include, but are not limited to, simple mechanical interlocking features and/or alignment locating features. Additionally, inserts may also be bonded with reversible bonding compounds. The backing plate 12 may be a single step machined surface. The backing plate 12 may include a top surface 20, side surfaces 18, and a bottom surface 16.

The plurality of lithographically derived inserts 14 may be produced by stereolithographic apparatus which converts liquid plastic into solid objects. Such technology may be used to create surface features not producible by traditional machining methods. Such technology may also be used to produce accurate surface tolerances as required for high definition applications.

Each of the plurality of lithographically derived inserts 14 may include a bottom surface 24, side surfaces 26, and a positive top surface 28, that may become the master tooling surface 22. The positive top surface 28 may be non-conformal. The plurality of lithographically derived inserts 14 may expand across the entire top surface 20 of backing plate 12. In certain embodiments, the plurality of lithographically derived inserts 14 may include various amounts of pieces. In certain embodiments, the plurality of lithographically derived inserts 14 includes three through eight inserts. The amount of plurality of lithographically derived inserts 14 may depend upon the complexity of the surface geometry and the degree of flexibility requested.

A method of manufacturing the master tooling assembly 10 for ceramic cores may include providing the plurality of lithographically derived inserts 14. The backing plate 12 may be provided as a locating surface for the plurality of lithographically derived inserts 14. The plurality of lithographically derived inserts 14 may be pieced together and placed on the backing plate 12. A non-conformal positive surface is generated from the plurality of lithographically derived inserts 14 pieced together. Examples of piecing together or combining a plurality of lithographically derived inserts 14 may involve, but is not limited to, 1) interlocking into the backing plate 12, 2) precision thin layer bonding, and 3) vacuum assisted surface contacting. The precision thin layer bonding may be with accomplished with a reversible thin layer bonding media. The backing plate 12 may include suction ports located in the top of the plate 20. Once the plurality of lithographically derived inserts 14 is set in position along the backing plate 12, a portion of the master tooling assembly 10 may be complete.

The plurality of lithographically derived inserts 14 and the backing plate 12 may form a first half 32 of a master tool. A second half 34 of the master tool may be formed by a second plurality of lithographically derived inserts 14 and a second backing plate 38. The second backing plate 38 may include a top surface 20, side surfaces 18, and a bottom surface 16. The second half 34 of the master tool may be combined with the first half 32 of the master tool to form a mold cavity. The combining of the first half 32 and the second half 34 of the master tool provides the master tooling assembly 10. Two negative flexible transfer molds may be created from the non-conformal positive surfaces of the plurality of lithographically derived inserts 14 and a second plurality of lithographically derived inserts 36 respectively. The negative flexible transfer molds may then be combined to produce a mold cavity into which a slurry can be introduced and cured to create a ceramic green body (ceramic core). The advanced ceramic core may be used for the investment casting of an advanced turbine blade. The second plurality of lithographically derived inserts 36 and the second backing plate 38 have the same properties as the plurality of lithographically derived inserts 14 and the backing plate 12 except for the second plurality of lithographically derived inserts 36 may have different non-conformal positive surfaces. Each of the second plurality of lithographically derived inserts 36 may include a bottom surface 24, side surfaces 26, and a positive top surface 28, that may become the master tooling surface 22.

As mentioned above, the backing surface may be a single step machined surface. Each of the plurality of lithographically derived inserts 14 and second plurality of lithographically derived inserts 36 may be interchanged for other lithographically derived inserts 14, 36 for minor changes. In applications where rapid iterations and prototypes need to be made, this method with interchangeable plurality of lithographically derived inserts 14 and second plurality of lithographically derived inserts 36 allows for quick adjustments. The tooling assembly, being readily adjustable, allows for a reduction in manufacturing costs and reduces the time in between required changes. FIG. 1 shows an example of advanced detailed features 30 of the plurality of lithographically derived inserts 14 for a turbine component.

While specific embodiments have been described in detail, those with ordinary skill in the art will appreciate that various modifications and alternative to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof

What is claimed is:

1. A method of manufacturing of a tooling assembly for ceramic cores, comprising:
   providing a plurality of lithographically derived inserts and a second plurality of lithographically derived inserts each comprising a bottom surface, side surfaces, and a positive top surface;
   providing a backing plate and a second backing plate each comprising a top surface, side surfaces, and a bottom surface, the backing plate and the second backing plate provided as a locator surface;
   generating a first non-conformal positive surface from the plurality of lithographically derived inserts pieced together and placed on the backing plate;
   generating a second non-conformal positive surface from the second plurality of lithographically derived inserts pieced together and placed on the second backing plate;
   creating a first negative flexible transfer mold from the first non-conformal positive surfaces of the plurality of lithographically derived inserts;
   creating a second negative flexible transfer mold from the second non-conformal positive surface of the second plurality of lithographically derived inserts; and
   preparing the negative flexible molds for casting an advanced ceramic core.

2. The method of tooling of claim 1, wherein the backing plate and the second backing plate are each a single step machined surface.

3. The method of claim 1, wherein the advanced ceramic core is for a component within the power industry.

4. The method of claim 1, wherein the advanced ceramic core is for a turbine blade.

5. The method of claim 1, wherein the ceramic core has fine features formed by the lithographically derived inserts and the ceramic core.

6. A method of manufacturing a ceramic core mold cavity, comprising:
   lithographically deriving a first plurality of tooling inserts;
   piecing together the first plurality of lithographically derived tooling inserts;
   generating a first non-conformal positive surface from the first plurality of pieced together lithographically derived tooling inserts;
   lithographically deriving a second plurality of tooling inserts;
   piecing together the second plurality of lithographically derived tooling inserts;
   generating a second non-conformal positive surface from the second plurality of pieced together lithographically derived tooling inserts;
   creating a first negative flexible transfer mold from the first non-conformal positive surface of the first plurality of lithographically derived tooling inserts;
   creating a second negative flexible transfer mold from the second non-conformal positive surface of the second plurality of lithographically derived inserts; and
   combining the first negative flexible transfer mold and the second negative flexible transfer mold to produce the ceramic core mold cavity.

7. The method of manufacturing a ceramic core mold cavity of claim 6, further comprising introducing a ceramic slurry into the ceramic core mold cavity.

8. The method of manufacturing a ceramic core mold cavity of claim 7, further comprising curing the ceramic slurry in the ceramic core mold cavity to create a green body ceramic core.

9. The method of manufacturing a ceramic core mold cavity of claim 8, further comprising heating the green body ceramic core to produce a ceramic core.

10. The method of manufacturing a ceramic core mold cavity of claim 6, wherein the first plurality of lithographically derived tooling inserts are pieced together on a first backing plate comprising a top surface, side surfaces, and a bottom surface and providing a locater surface.

11. The method of manufacturing a ceramic core mold cavity of claim 10, wherein the first plurality of lithographically derived tooling inserts comprises one hundred percent surface coverage over the backing plate.

12. The method of manufacturing a ceramic core mold cavity of claim 11, wherein the first backing plate is a single step machined surface.

13. The method of manufacturing a ceramic core mold cavity of claim 6, wherein the first plurality of lithographically derived tooling inserts are pieced together by location features.

14. The method of manufacturing a ceramic core mold cavity of claim 6, wherein the first plurality of lithographically derived tooling inserts are pieced together by contour location and interlocking edge features on the first plurality of lithographically derived tooling inserts.

15. The method of manufacturing a ceramic core mold cavity of claim 6, wherein the plurality of lithographically derived inserts are pieced together by suction ports located on a surface of the mold cavity.

16. The method of manufacturing a ceramic core mold cavity of claim 6, wherein the plurality of lithographically derived inserts are pieced together by reversible thin layer bonding media.

17. The method of manufacturing a ceramic core mold cavity of claim 6, wherein the ceramic core is for a component within the power industry.

18. The method of manufacturing a ceramic core mold cavity of claim 6, wherein the ceramic core is for a turbine blade.

19. The method of manufacturing a ceramic core mold cavity of claim 6, wherein the ceramic core has fine features formed by the lithographically derived inserts and the ceramic core.

* * * * *